Nov. 29, 1966 J. M. ALLEGRETTI ETAL 3,289,048

ELECTRIC CIRCUIT MODULE

Filed Oct. 27, 1964 3 Sheets-Sheet 1

INVENTORS
JOHN M. ALLEGRETTI
ROY J. LEVY
ROBERT SNYDER
JOHN W. SULLIVAN

BY Frank D Prager

ATTORNEY

ELECTRIC CIRCUIT MODULE

INVENTORS
JOHN M. ALLEGRETTI
ROY J. LEVY
ROBERT SNYDER
JOHN W. SULLIVAN

BY Frank D Prager
ATTORNEY

ELECTRIC CIRCUIT MODULE

Filed Oct. 27, 1964

INVENTORS
JOHN M. ALLEGRETTI
ROY J. LEVY
ROBERT SNYDER
JOHN W. SULLIVAN
BY
Frank D Prager
ATTORNEY

United States Patent Office 3,289,048

Patented Nov. 29, 1966

3,289,048

ELECTRIC CIRCUIT MODULE

John M. Allegretti, San Jose, Roy J. Levy and Robert Snyder, Sunnyvale, and John W. Sullivan, Los Altos, Calif., assignors to Philco Corporation, Philadelphia, Pa., a corporation of Delaware Filed Oct. 27, 1964, Ser. No. 406,738
2 Claims. (Cl. 317—101)

This invention relates to electronic circuit modules particularly adapted for use in computers and the like.

It is the object of the invention to combine minimum size with maximum firmness of module elements, particularly in a module providing for the support and use of a so-called microcircuit, where the terminals are minute, numerous, and closely spaced, and where it is necessary nevertheless to establish good and firm contact between each terminal and an external circuit structure.

Toward this and related objects the invention provides a module wherein a small and preferably rectangular module base or plate has a substantial number of connector apertures, for instance twenty-four of them, distributed over the plate surface. Connector plugs or posts are secured to the plate, one in each aperture, and extend from one surface of the plate as a group. They extend from the opposite side of the plate to form a kind of cradle for the firm support and connection of a microcircuit panel. The cradle portions of the connectors are preferably arranged in two rows, one row along each long side of a rectangular mounting plate, while the plugs are arranged in four rows. The transition from two to four rows is achieved by alternate bent connector structures near the plate, as described hereinafter.

In the drawing appended hereto FIGURE 1 is a perspective exploded view of the new module, also indicating how the module may be installed in larger apparatus such as a computer unit.

Figure 1:
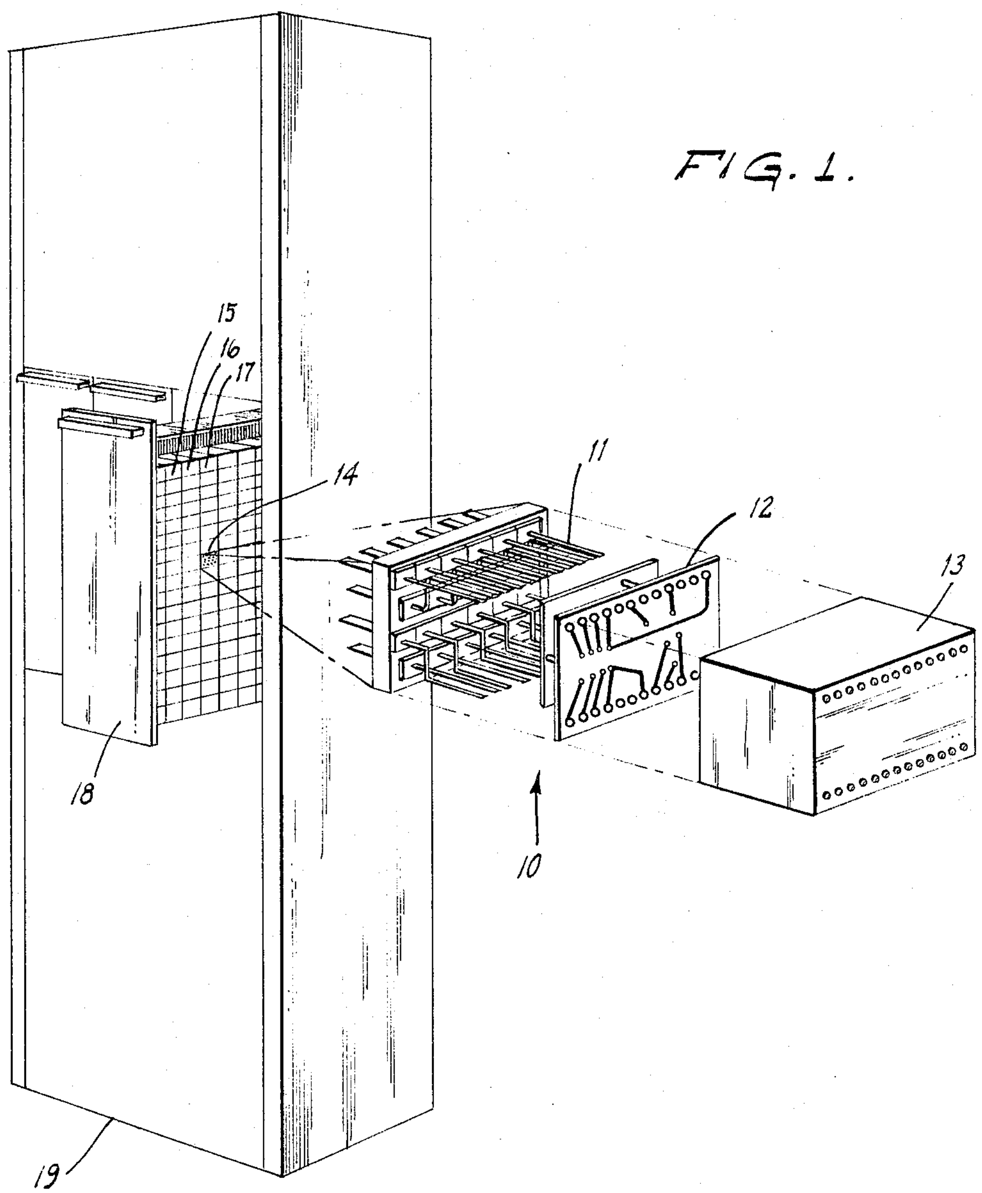
Figure 7:
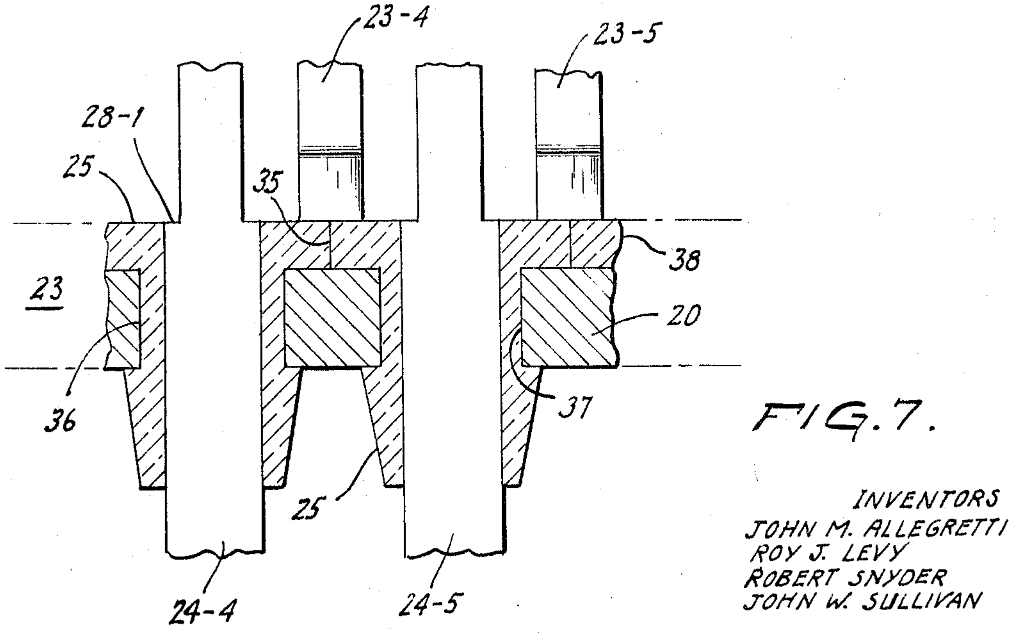
FIGURE 7 is a fragmentary sectional view showing the preferred form of a certain detail and taken generally along line 7—7 in FIGURE 4.

The view of FIGURE 7 is drawn on a greatly enlarged scale, while the module is slightly enlarged in the exploded portion of FIGURE 1 and is enlarged to an intermediate degree in FIGURES 2 to 6.

Referring to FIGURE 1, module 10 comprises a cradle 11 of metallic terminal-connecting and panel supporting strips for electronic micro-circuit panel or component subassembly 12. Normally a cover or housing 13 overlies the microcircuit and its cradle. The entire module 10 is normally plugged into a socket unit 14, and combined with other, similarly constructed and installed modules 15, 16, 17, etc., which cooperate for instance to constitute a drawer structure 18 forming part of a computer device 19. In the drawing, module 10 has been removed from socket area 14 in drawer 18, and has been brought far forward as is schematically indicated by broken lines.

Figures 2, 3:
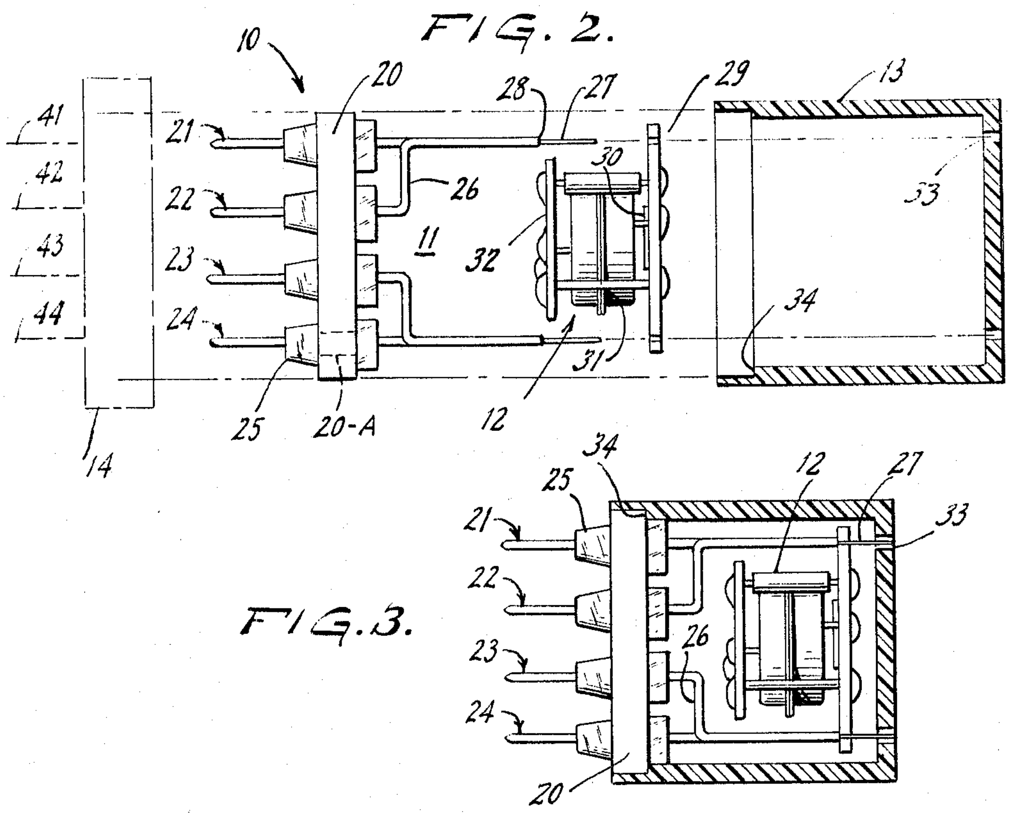
FIGURE 2 is an exploded end view, partly in section, of the same module.
FIGURE 3 is a partly sectional end view of the module in assembled condition.
Figure 5:
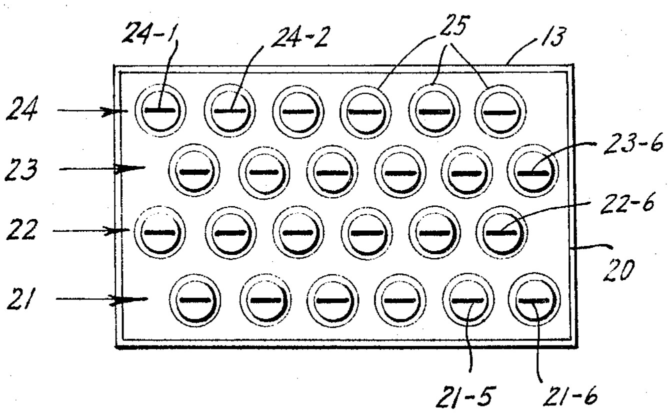
FIGURES 5 and 6 are, respectively, a base view and a perspective base view of the new module.

Cradle 11 comprises a rigid, generally flat, preferably metallic support plate which is shown edgewise in FIGURE 2 and designated by numeral 20. As also indicated the plate has apertures 20–A, and has a terminal connector strip extending through each aperture. Two pairs 21/22 and 23/24 of parallel rows of connector strips are thus distributed over plate 20, as best shown in FIGURE 5. Each terminal connector strip is mechanically secured to the plate and electrically insulated therefrom by a grommet 25 extending through one of apertures 20–A.

Each row 21 etc. is shown as containing six metal connectors. It extends from near one end of the plate to the other end, with staggered arrangement, as is indicated by FIGURES 1 and 4 to 6. Twenty-four metal connector apertures 20–A and connectors extending therefrom are thus distributed substantially uniformly over plate 20. They extend from one surface of this plate to the computer unit in four rows 21 to 24, while the other and mircrocircuit supporting side of plate 20 has these twenty-four connectors arranged in only two rows or groups, each disposed along one margin of the plate and each forming a substantially planar group of connectors, upstanding from the plate. This latter arrangement is visible in FIGURE 1 and is more fully indicated on the right side of each of FIGURES 2 and 3.

In order to obtain this two-row arrangement on the microcircuit supporting side of the plate, while using the more uniformly distributed four-row arrangement on its computer connecting side, the terminal connectors of the two inner rows 22, 23 are bent, adjacent the microcircuit side of plate 20, to provide connector portions 26 extending parallel to the surface of the plate, each portion 26 being centered between two connectors of the adjacent outer rows 21, 24. The outer connectors extend through the support plate in straight lines, all normal to the plate surfaces.

As further shown in FIGURE 2 each terminal strip has on its microcircuit side, a recessed end portion 27 with a shoulder 28 at the transition point from full cross-section to recessed cross-section. These end portions are indexed with apertures or perforations 29 in microcircuit panel 12, which apertures 29 are surrounded by metallic terminal portions of microcircuit 30, or of other circuit components 31, or both. The present microcircuit panel 30 is shown as also supporting an additional and smaller panel 32, slightly spaced therefrom in a so-called "cordwood" arrangement. On this added panel further microcircuits, or components, or both may be disposed, being suitably interconnected with terminals at apertures 29 and thereby with the rows of terminal strips 21, 22, etc.

By means of the described arrangement of base 20 and plug-connector units 21, etc., the invention provides a cradle structure for panel unit 12 which is not only compact, as shown in FIGURE 3, but also extremely firm. The unit of FIGURE 3 is shown as being assembled also with cover 13, which overlies circuit unit 12 and its terminal and support strips. End portions 27 of the terminal strips extend through panel holes 29 into corresponding apertures 33 of cover 13, in order to provide test points readily accessible without removal of this cover. Proper alignment of the cover with the remainder of the module structure is provided by a shoulder 34 on the inside of the cover, matching an edge portion of support plate 20.

The several units shown separately in FIGURE 2, are simple and convenient to assemble, thereby facilitating inspection and service as well as original construction of the module. Directly under cover 13, module unit 10 has two parallel rows of conductor ends or points 27, indexed with panel holes 29 in microcircuit 12. By means of this construction it is possible in the initial assembly of the module to mount the microcircuit by simply slipping it into the cradle space formed between the two rows, thus engaging each conductor end with one of the panel apertures. Thereupon cover 13 is slipped onto base 20, at which time each conductor end enters one of the test holes 33. Finally, assembly 10, 12, 13 is engaged with socket unit 14 of the computer or corresponding device, by the entire group of plugs, distributed over base 20, into corresponding sockets in said unit.

Figure 4:
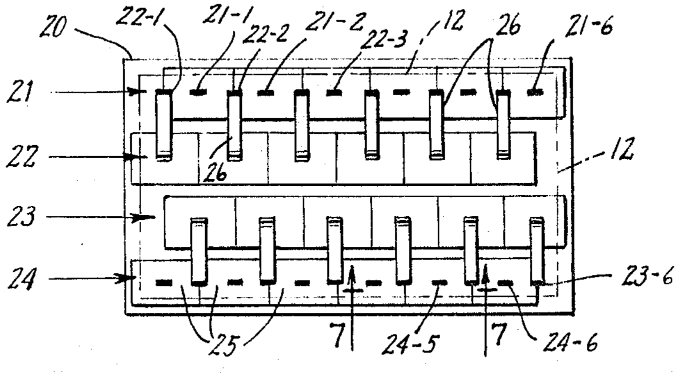
FIGURE 4 is a plan view showing the new module without its cover and with only a phantom showing of its circuit panel.
Figure 6:
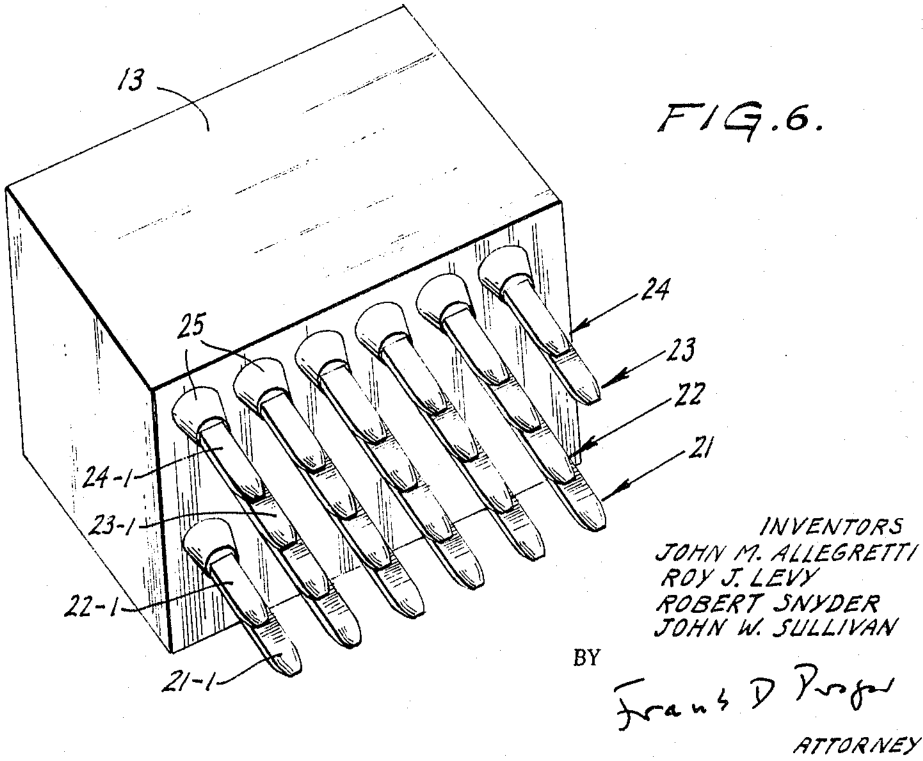

The space saving and yet rugged nature of the new arrangement is best indicated by the enlarged views of FIGURES 4 to 6. The microcircuit side of the unit, shown in FIGURE 4, has two pairs 21/22 and 23/24 of planar groups of minute, closely spaced circuit connectors 22–1, 21–1, 22–2, etc., each connector being firmly anchored in plate 20 by its insulator 25. As best shown in FIGURES 5 and 6 the four rows of anchoring insulators 25 are distributed so as substantially to occupy the entire surface area of plate 20. Thus we have provided each insulator and its connector with a relative maximum of support in the anchoring area, and produced firm and rugged plug structure, as best shown in FIGURE 6.

The anchoring of metal connectors (for instance 24–4, 23–4) in their grommets 25, and the anchoring of these grommets in plate 20 is best shown in FIGURE 7. Each connector strip has a wide and relatively strong plug portion, below a shoulder 28–1, which portion is molded into grommet 25. The strip is of flat configuration, whereby it is prevented from rotating in the grommet. Side surfaces 35 of grommets 25 are in such proximity or contact (also see FIGURE 4) as to avoid rotation of the grommets in the apertures of plate 20, wherein the grommets are anchored as indicated at 36, 37. For this purpose the grommets preferably have square flanges 38.

According to a specific aspect of the invention, grommets or insulators 25 of alternate rows, for instance rows 21 and 22, are staggered to facilitate the use of simple bent portions 26 in connectors of inner rows 22, 23 (FIGURE 4, also see FIGURES 2 and 3). These bent portions are easily and accurately produced by providing each metal strip of these inner rows with a bend and a reverse bend at angles of 90 degrees to the general plane of the strip. By means of such bending and by the firm anchoring of the several insulators (preferably preventing rotation thereof by side-to-side contact of said insulators as shown in FIGURE 4) it becomes possible to arrange connecting strips 22–1, 21–1, 22–2, 21–2, etc., of inner and outer rows 21, 22 in regular alternation, each in an accurately centered position between connectors of the other row. Cradle 11 of FIGURE 1 is thus formed of two combined rows 21/22 and 23/24 of connector strips (FIGURES 2 to 4), each row having such strips in substantially co-planar arrangement, parallel with the other row.

Thus it will be seen that one side of cage unit 12 (FIGURES 5 and 6) presents the microcircuit connectors as relatively massive plugs uniformly distributed over the area of the unit, while the other side (FIGURE 4) has the same connectors disposed as relatively slender strips, all distributed along two edges of said area. These connector strips extend through panel 12 and preferably into the holes in cover 13. When interconnected by panel 12 near one end, and by base plate 20, these aligned and relatively slender strips constitute a strong cradle structure, not easily distorted even by strong impacts or vibrations and thus guaranteeing proper service of microcircuit 12. At the same time, as best shown in FIGURE 3, the assembly is very compact, even in the event that it comprises a microcircuit of many components and terminals. In addition, testing of the microcircuit is greatly facilitated by the provision of two rows of terminal points 27 extending through cover apertures 33.

While only a single embodiment of the invention has been described, the details thereof are not to be construed as limitative of the invention. The invention contemplates such variations and modifications as come within the scope of the appended claims.

We claim:

1. A circuit module comprising a panel with circuit means thereon and with two rows of apertured circuit terminals, each row being disposed along one of a pair of substantially parallel edges of the panel; a mounting plate underlying the panel at a distance therefrom and having a series of apertures, said apertures being distributed over the area of the plate; a series of electric connectors, each having a portion extending through a corresponding one of said apertures, beyond the plate surface facing the panel, to and through one of the apertured circuit terminals, at least some of said portions extending over said plate from inner parts toward side edges thereof, each connector extending beyond the other surface of the plate, at right angles to the plate, for connecting the various circuit terminals with external circuit structure; and housing means substantially covering the end portions of the connectors extending through said circuit terminals.

2. A circuit connector structure comprising a panel with circuit means thereon and with at least two rows of apertured circuit terminals, such rows being disposed along pairs of substantially parallel edges of the panel; a mounting plate underlying the panel at a distance therefrom and having a series of apertures, said apertures being distributed over the area of the plate; a series of electric conductors, each extending through one of said apertures, having an end portion spaced from the plate surface facing the panel and extending through one of said circuit terminals, and each conductor also having an opposite portion, extending beyond the other surface of the plate, at right angles to the plate, for connecting the various circuit terminals with external circuit structure; and a cover associated with said plate and conductors, substantially covering the end portions of the conductors extending through said circuit terminals, and having a series of holes, along parallel edges of the cover, into which holes said end portions extend.

References Cited by the Examiner

UNITED STATES PATENTS 3,166,372 1/1965 Just.

FOREIGN PATENTS 1,364,127 5/1964 France.
658,342 10/1951 Great Britain.

ROBERT K. SCHAEFER, *Primary Examiner.*

KATHLEEN H. CLAFFY, *Examiner.*

ROBERT S. MACON, J. J. BOSCO, *Assistant Examiners.*